United States Patent
Brenneman et al.

(10) Patent No.: US 7,213,860 B2
(45) Date of Patent: May 8, 2007

(54) COMPOSITE CARGO DOOR/RAMP

(75) Inventors: Ryan Brenneman, White Pigeon, MI (US); Ryan Miller, Elkhart, IN (US); Steve Brenneman, Nappanee, IN (US); Evan Bontrager, Goshen, IN (US)

(73) Assignee: Nappanee Window, LLC, Nappanee, IN (US)

( * ) Notice: Subject to any disclaimer, the term of this patent is extended or adjusted under 35 U.S.C. 154(b) by 164 days.

(21) Appl. No.: 10/911,841

(22) Filed: Aug. 5, 2004

(65) Prior Publication Data

US 2006/0028048 A1     Feb. 9, 2006

(51) Int. Cl.
*B60R 3/00*    (2006.01)

(52) U.S. Cl. .................. 296/61; 296/146.8; 414/537

(58) Field of Classification Search ........... 296/146.8, 296/146.6, 57.1, 61, 191; 414/537
See application file for complete search history.

(56) References Cited

U.S. PATENT DOCUMENTS

| | | | |
|---|---|---|---|
| 3,155,203 A | 11/1964 | Kappen | 189/46 |
| 3,258,019 A | 6/1966 | Bellas et al. | 134/99 |
| 3,308,845 A | 3/1967 | Bellas et al. | 136/234.6 |
| 4,839,991 A * | 6/1989 | Rathgeb | 49/462 |
| 4,966,510 A | 10/1990 | Johnson, Jr. | |
| 5,314,200 A | 5/1994 | Phillips | |
| 5,342,105 A | 8/1994 | Miles | |
| 5,769,593 A | 6/1998 | Buffaloe | |
| 6,068,324 A | 5/2000 | DeKlotz | |
| 6,164,716 A * | 12/2000 | Palazzolo et al. | 296/187.12 |
| 6,179,371 B1 * | 1/2001 | Miller | 296/191 |
| 6,196,617 B1 * | 3/2001 | Beck | 296/146.11 |
| 6,941,875 B2 * | 9/2005 | Norton et al. | 105/397 |

* cited by examiner

*Primary Examiner*—Joseph D. Pape
(74) *Attorney, Agent, or Firm*—Woodard, Emhardt, Moriarty, McNett & Henry LLP

(57) ABSTRACT

A cargo enclosure including a floor having a plurality of edges including a first edge, a second edge and a third edge. At least two sidewalls, including a first sidewall and a second sidewall, the first sidewall connected to the first edge of the floor, the second sidewall connected to the second edge of the floor. At least one hinge is connected along the third edge of the floor, the at least one hinge being rotatable about an axis. A composite door is connected to the at least one hinge, the door having a closed position and the hinge having a plurality of torsion springs rotatable about the axis, the plurality of torsion springs biasing the composite door toward the closed position.

8 Claims, 5 Drawing Sheets

COMPOSITE CARGO DOOR/RAMP

BACKGROUND OF THE INVENTION

1. Field of the Invention

The present invention relates to a cargo door that is utilized additionally as a ramp.

2. Description of the Related Art

Effective use of a door as a ramp that folds from the back of a transport device and utilizes struts and/or cables for support is known in the art. Even doors having multiple folds therein are utilized to provide a ramp surface into a storage or transporting container. Door/ramp combinations that are strong enough to hold the weight of vehicles are typically themselves rather heavy requiring supports underneath and/or cables to assist in the closing of the door/ramp. In lightweight trailers, such as those that carry mowers, the weight of the ramp is reduced by utilizing a permeable ramp allowing not only a reduction in material to thereby reduce weight, but also allowing air to travel therethrough to lower the aerodynamic drag on such a trailer.

The cargo system, which is defined as that which a commercial carrier would utilize to transport loads over some distance, requires a method of unloading. Many cargo transports, such as semi-tractor trailers utilize loading docks at the cargo pickup and delivery points. In those instances, a ramp or other unloading device is not necessary because of the elevated nature of the loading dock. When delivering or picking up from smaller businesses and for individuals, a loading dock is often not available. As such, lift gates are often attached to the back of a vehicle to allow the unloading of heavy cargo. A lift gate is normally a hydraulically operated mechanism that is powered from the electrical system of the vehicle to elevate and/or lower cargo onto the ground. Other solutions include ramps that are stored beneath the truck body which are slid out and then connected to the tail end of the truck, thereby allowing a ramped surface for the loading and unloading of cargo.

What is needed in the art is a door/ramp that can be lowered without the necessity of cables, struts, or hydraulics to counterbalance the weight of the door.

SUMMARY OF THE INVENTION

The present invention provides a lightweight composite door with torsional springs offsetting the weight thereof.

The invention comprises, in one form thereof, a cargo enclosure including a floor having a plurality of edges, including a first edge, a second edge and a third edge. At least two side walls, including a first side wall and a second side wall that are each connected to an edge of the floor. At least one hinge is connected along an edge of the floor and is rotatable about an axis to which a composite door is connected, the door having a closed position. A plurality of torsion springs are rotatable about the axis and the torsion springs bias the composite door toward a closed position.

An advantage of the present invention is that the composite structure of the door is lightweight yet strong enough to allow the weight of cargo and vehicles to traverse the ramp surface to enter into the cargo enclosure.

Yet another advantage of the present invention is that the door is light enough to not require cables to lift the door into a closed position.

Yet another advantage of the present invention is that a door assembly can be easily installed upon an existing vehicle in a relatively short amount of time.

A further advantage of the present invention is that the size of the door can be customized with simple tools to fit non-standard door sizes.

A further advantage of the present invention is that the composite door is relatively thin, being less than 2 inches in thickness.

A yet further advantage of the present invention is that one person can lift the composite door/ramp, the lifting force being less than 25 pounds.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
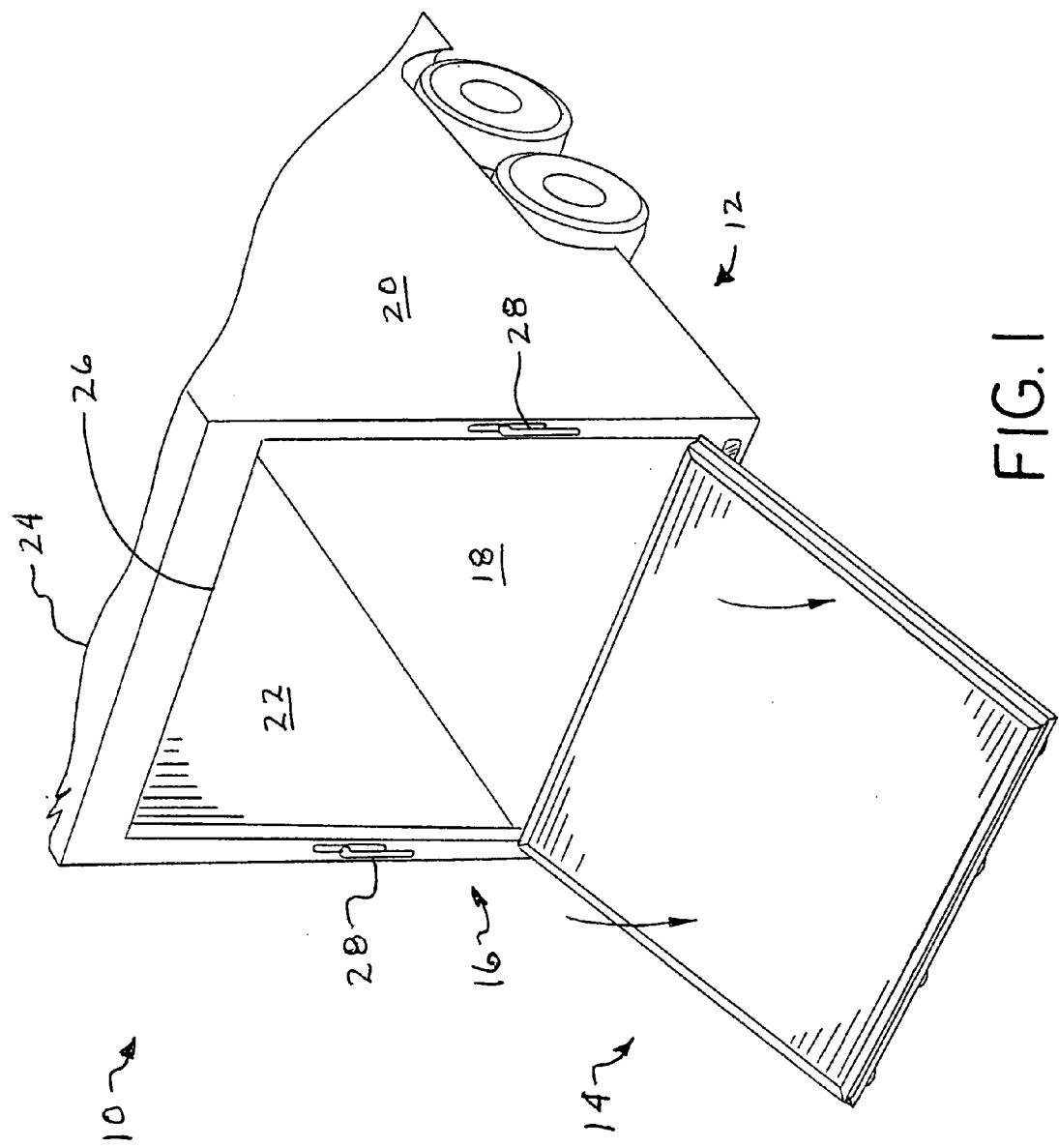
FIG. 1 is a perspective view of an embodiment of a composite door/ramp of the present invention.
Figure 2:
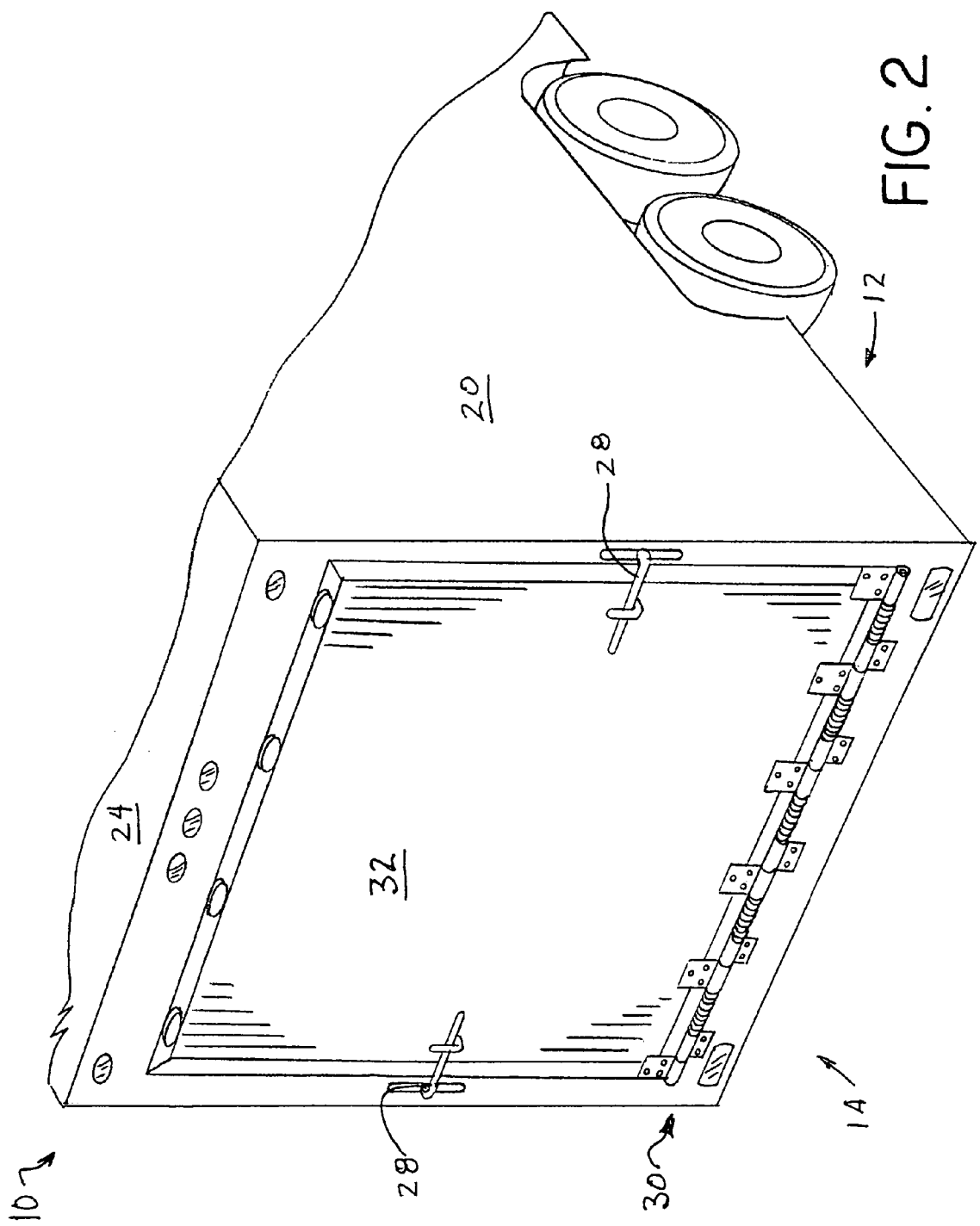
FIG. 2 is a perspective view of the door/ramp of FIG. 1, in a closed position.

Referring now to the drawings, and more particularly to FIGS. 1 and 2, there is shown a cargo enclosure assembly 10, which generally includes enclosure 12 and a composite door assembly 14. Enclosure 12 includes an opening 16, a floor 18, a sidewall 20, another sidewall 22, a roof 24, an opening edge 26 and latching mechanisms 28.

Opening 16 is an access opening through which cargo is loaded into enclosure 12. alternatively, enclosure 12 may be of an open construction, such as a car carrier. Floor 18 is attached to framework underneath to thereby support floor 18 and the support structure may include a transport mechanism such as wheels or a truck chassis. Attached to the sides of floor 18 are sidewalls 20 and 22, which are connected to roof 24. Sidewalls 20 and 22 are connected along edges of floor 18. Along an edge of floor 18 that corresponds to opening 16 is attached composite door assembly 14. Opening edge 26 defines the perimeter of opening 16, which interfaces with a portion of composite door assembly 14 in providing a secure enclosure when composite door assembly 14 is in a raised and closed position. When composite door assembly 14 is in a closed position, as is shown in FIG. 2, latching mechanisms 28 are utilized to secure door assembly 14 in a closed position.

Figure 3:
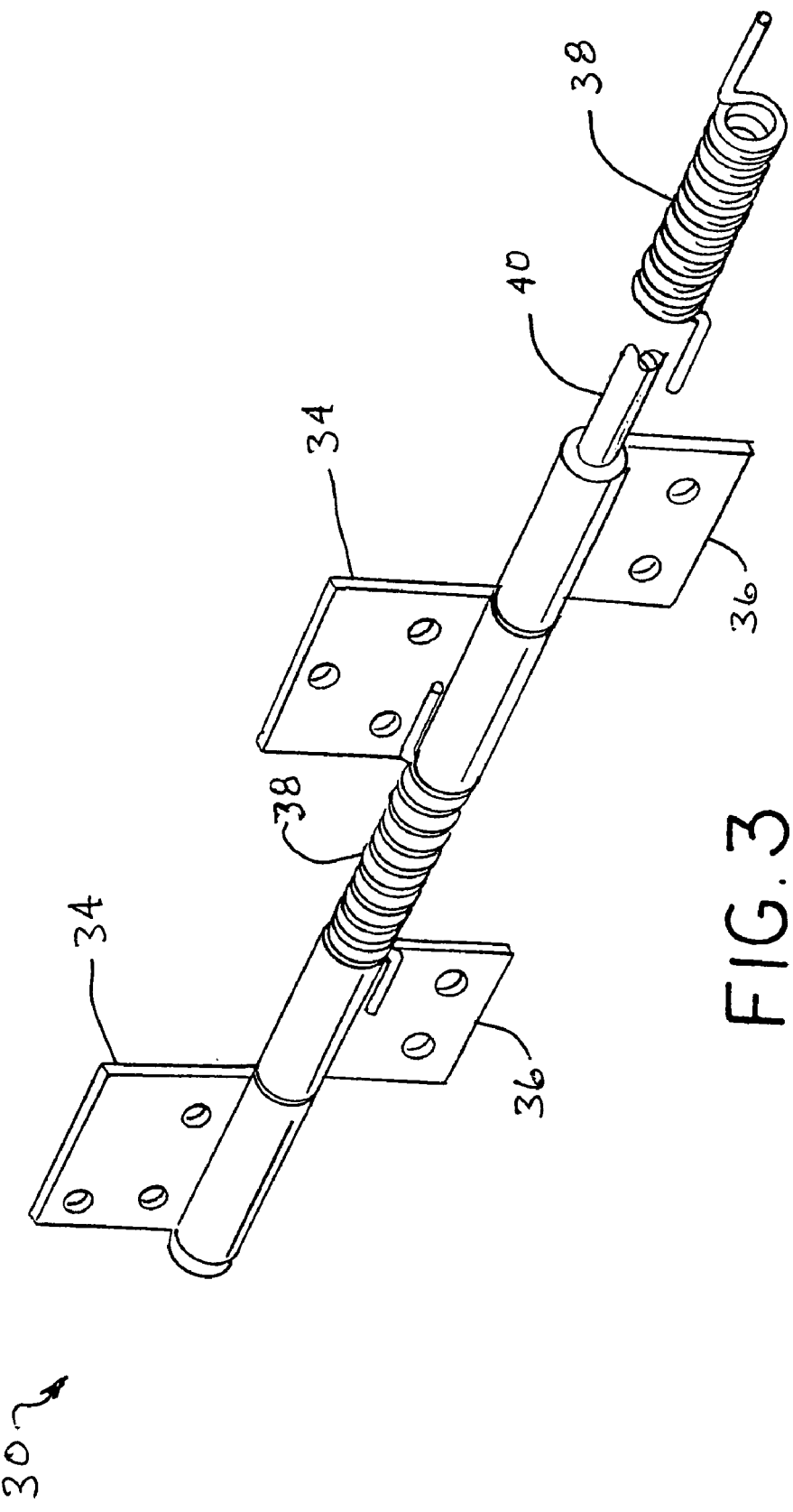
FIG. 3 is a perspective view of a hinge assembly utilized by the door/ramp of FIGS. 1 and 2.

Now, additionally referring to FIG. 3, there is shown hinge assembly 30 that includes leaves 34 and 36, torsional springs 38 and hinge pin 40. Leaves 36 attach to a portion of enclosure 12 and leaves 34 attach to door 32. Torsional springs 38 are inserted over hinge pin 40 having extensions that interact with leaves 34 and 36 to thereby bias leaves 34 and 36 to be approximately 180° apart.

Figure 4:
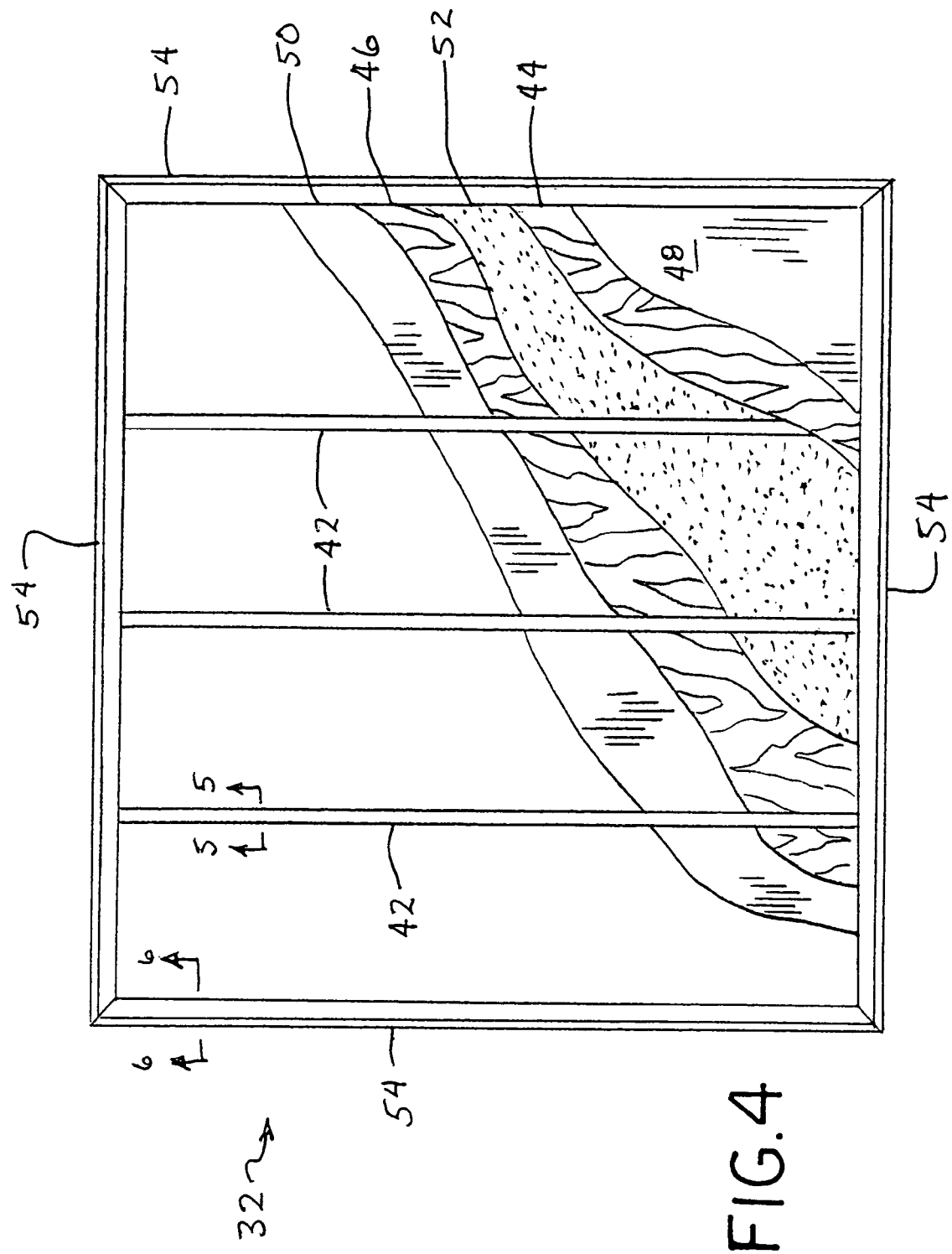
FIG. 4 is a partially sectioned view of a composite door of FIGS. 1 and 2.
Figure 5:
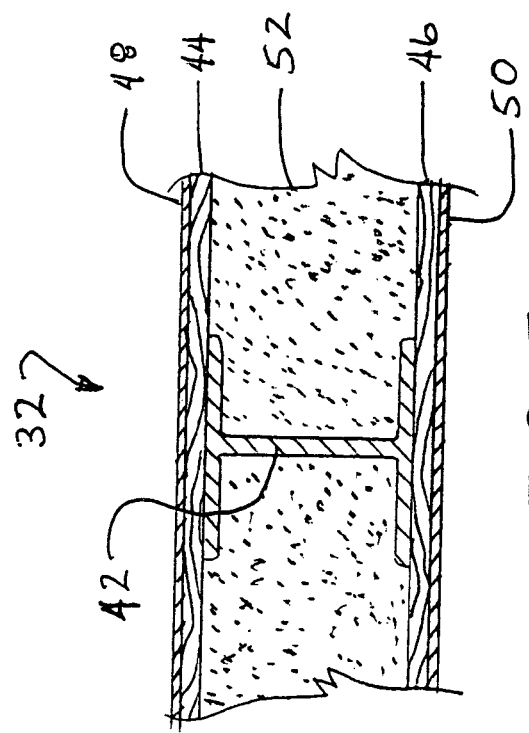
FIG. 5 is a cross-sectional view, along 5—5, of a portion of a door/ramp of FIGS. 1, 2 and 4.
Figure 6:
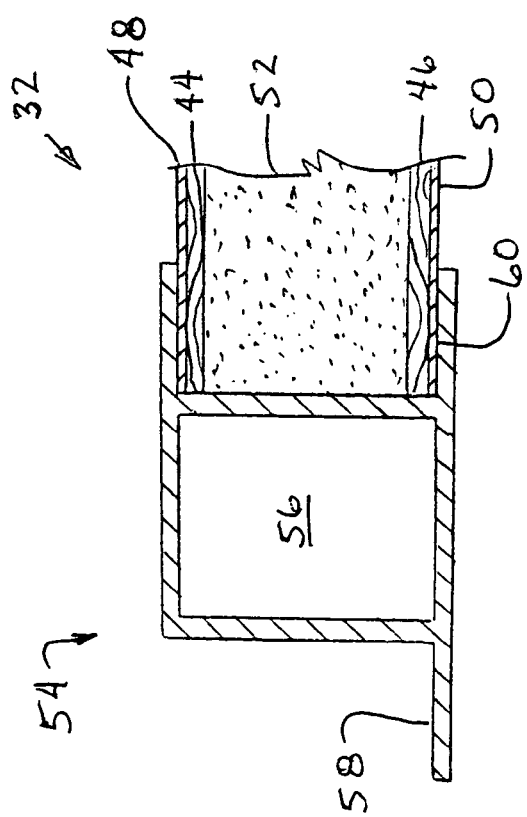
FIG. 6 is a partial cross-sectional view, along 6—6, of an edged portion of the composite door of FIGS. 1, 2 and 4.

Now, additionally referring to FIGS. 4–6, details of door 32 are more fully seen and explained. Door 32 includes internal structural supports 42, inner laminate layers 44 and 46, outer laminate layers 48 and 50, filler 52 and edge supports 54. Structural supports 42 may be in the form of I-beams 42, that may be formed of an aluminum material. A foam material 52 is inserted between I-beams 42, as shown in FIGS. 4 and 5. Laminated to a surface of I-beams 42 and 52 are inner layers 44 and 46. Inner layers 42 and 46 may be composed of a lauan laminate wood product. Additional outer layers 48 and 50 may be laminated over lauan 44 and 46. At least one outer layer 48 or 50 will be applied, which may be made of a glass reinforced polyester such as Filon®. The composite structure of door 32 advantageously provides significant strength and yet is lightweight in nature.

Along the edges of door 32, edge support 54 is inserted over layers 44, 46, 48, 50 and 52 to thereby preserve the integrity of the edge of door 32. Edge support 54 includes an interior cavity 56, a lip 58 and a C-shaped protrusion 60. As shown in FIG. 4, edge support 54 may be mitered to allow edge support 54 to extend around the entire perimeter of door 32. Alternatively, edge support 54 may have a formed end to allow the insertion of one portion into another portion of edge support 32 along the corners of door 32. Edge support 54 is formed such that C-shaped protrusion 60 forms an open cavity into which composite door 32 may be inserted. C-shaped protrusion 32 may have an adhesive applied thereto to connect edge support 54 to door 32. The edges of layers 44, 46, 48, 50 and 52 substantially end along a plane thereby allowing a tight fit with the composite structure of door 32. Cavity 56 provides additional strength along the edges while adding little weight thereto. The material that surrounds cavity 56 also allows for a corner gusset when edge support 54 is mitered in the construction process. Lip 58 is utilized to overlap opening 16 and interfaces with opening edge 26. A seal may be utilized along with lip 58 to provide additional sealing. An edge of door 32 interfaces with hinge 30 to provide a pivotal axis upon which door 32 can be alternatively swung into opened and closed positions relative to enclosure 12.

Alternative, to the square corners illustrated in the figs. Edge supports 54 may be formed with a radius, on at least the two corners of door 32 which are uppermost when door 32 is in a closed position.

Advantageously, the thickness of composite door 32 is approximately 2 inches or less. Preferably, the thickness of door 32 is approximately 1½ inches. In operation, the combination of the lightweight composite structure of door 32 and the proportional offset bias provided by torsional springs 38 allow door 32 to be lifted by an individual exerting less than 25 pounds of lifting force, and preferably less than 25 pounds. This advantageously allows torsional springs 38 to be in a relatively unbiased position when door 32 is in a closed position. This advantageously allows an installer to install leaves 34 and 36 to door 32 and enclosure 12 without having to preload torsional springs 38.

Composite door 32 is assembled by positioning I-beams 42 in a spaced apart manner by the insertion of foam 52 therebetween. First layers 44 and 46 are laminated to I-beams 42 and foam 52 with additional surfaces such as Filon® added as an outer layer 48 or 50. The surfaces are held in place by way of an adhesive, thereby creating a laminated structure. This subassembly may be sold without edge supports 54 installed to thereby allow a custom installation. Composite door 32 can be cut to size and then edge supports 54 cut and installed thereon. In one embodiment, supports 54 are installed on a standard size composite door 32 to thereby be quickly installed upon enclosure 12. The composite door of the present invention advantageously allows for the dual functionality of a door and ramp without adding significant weight to enclosure 12. Further, the lightweight nature allows for a ramp that does not require cabling nor expansion springs to lift the door, thereby eliminating one potential problem area that is associated with angled cables in the vicinity of moving cargo. Further, installation of composite door assembly 14 is easily installed, since no provision for cabling or expansion springs are needed.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combination cargo door/ramp, comprising:
   a plurality of laminated layers;
   at least one internal structural support connected to at least two of said plurality of laminated layers;
   at least one hinge connected along an edge of said plurality of laminated layers, said at least one hinge rotatable about an axis; and
   a plurality of torsion springs rotatable about said axis, said plurality of torsion springs biasing said at least one hinge.

2. The combination of claim 1, further comprising foam filling a substantial portion of space adjacent to said at least one internal structural support.

3. The combination of claim 2, wherein said at least one structural support is an I-beam.

4. The combination of claim 2, wherein said plurality of laminated layers include at least three layers with one of the layers substantially covering another of said at least three layers.

5. The combination of claim 4, wherein said at least three layers include two layers of lauan and at least one layer of a glass reinforced polyester, said at least one structural support being an aluminum I-beam.

6. The combination of claim 1, wherein the combination has a thickness of less than approximately 2 inches.

7. The combination of claim 1, wherein said axis is substantially horizontal.

8. The combination of claim 1, wherein said plurality of laminated layers are substantially coplanar across an entire surface of the door/ramp.

* * * * *